United States Patent [19]

Tucker

[11] Patent Number: 5,788,315
[45] Date of Patent: Aug. 4, 1998

[54] TONNEAU COVER APPARATUS

[75] Inventor: W. David Tucker, Palatine, Ill.

[73] Assignee: Design Automotive Group, Inc., Addison, Ill.

[21] Appl. No.: 659,049

[22] Filed: Jun. 3, 1996

[51] Int. Cl.$^6$ .................................................. B60P 7/04
[52] U.S. Cl. ........................... 296/100; 160/395; 24/487
[58] Field of Search ........................ 296/100; 160/383, 160/391, 395, 399, 402; 24/487; 135/119

[56] References Cited

U.S. PATENT DOCUMENTS

| | | | |
|---|---|---|---|
| 3,172,419 | 3/1965 | Lewis | 135/119 |
| 3,373,464 | 3/1968 | Ausnit | 24/201 |
| 4,036,521 | 7/1977 | Clenet | 296/100 |
| 4,158,244 | 6/1979 | Stefan | 4/172.21 |
| 4,279,064 | 7/1981 | Simme | 24/248 R |
| 4,292,913 | 10/1981 | Siebert et al. | 114/219 |
| 4,403,642 | 9/1983 | Morris | 160/380 |
| 4,496,184 | 1/1985 | Byrd et al. | 296/100 |
| 4,639,033 | 1/1987 | Wheatley et al. | 296/100 |
| 4,726,411 | 2/1988 | Conley | 160/395 |
| 4,944,545 | 7/1990 | Simme | 296/43 |
| 5,058,652 | 10/1991 | Wheatley et al. | 160/327 |
| 5,121,960 | 6/1992 | Wheatley | 296/100 |
| 5,207,262 | 5/1993 | Rushford | 160/354 |
| 5,251,951 | 10/1993 | Wheatley | 296/100 |
| 5,261,719 | 11/1993 | Tucker | 296/100 |
| 5,263,761 | 11/1993 | Hathaway et al. | 296/100 |
| 5,267,771 | 12/1993 | Rothe | 296/121 |
| 5,275,458 | 1/1994 | Barben et al. | 296/100 |
| 5,365,994 | 11/1994 | Wheatley et al. | 160/354 |
| 5,385,377 | 1/1995 | Girard | 296/36 |
| 5,460,423 | 10/1995 | Kersting et al. | 296/100 |
| 5,472,256 | 12/1995 | Tucker | 296/100 |
| 5,487,585 | 1/1996 | Wheatley | 296/100 |
| 5,522,635 | 6/1996 | Downey | 296/100 |
| 5,553,652 | 9/1996 | Rushford | 160/354 |

FOREIGN PATENT DOCUMENTS

| | | | |
|---|---|---|---|
| 1467374 | 2/1966 | France | 160/395 |
| 3812506 | 9/1989 | Germany | B60J 7/10 |

OTHER PUBLICATIONS

Extang advertisement, Specialty Automotive Magazine, p. 33, Winter 1993.
Extang Corporation brochure, at least as early as 1994.

*Primary Examiner*—Gary C. Hoge
*Attorney, Agent, or Firm*—Dick and Harris

[57] ABSTRACT

Tonneau cover apparatus for rail mounted tonneau cover systems for pick-up truck beds and the like are provided. The invention included a spacer member for a accommodating seasonal dimensional variations in covers; adjustable corner connector apparatus for non-rectangular truck beds; improved adjustable snap-type closure members for covers, and an improved snapless cover fastener.

3 Claims, 6 Drawing Sheets

TONNEAU COVER APPARATUS

BACKGROUND OF THE INVENTION

1. The Field of the Invention

The present invention relates to tonneau cover apparatus, such as are utilized for covering the beds of pickup trucks.

2. Background of the Invention

Rail-mounted tonneau cover apparatus, such as are used to cover the truck bed areas of pickup trucks, are known. Such cover apparatus are disclosed in references including: Nett, U.S. Pat. No. 4,730,866; Nett, U.S. Pat. No. 4,838,602; Wheatley et al., U.S. Pat. No. 4,639,033; Wheatley et al., U.S. Pat. No. 5,058,652; Wheatley et al., U.S. Pat. No. 5,121,960; Wheatley et al., U.S. Pat. No. 5,310,238; Wheatley, U.S. Pat. No. 5,251,951; Wheatley, U.S. Pat. No. 5,487,585; Tucker, U.S. Pat. No. 5,152,574; Tucker, U.S. Pat. No. 5,261,719; and Tucker, U.S. Pat. No. 5,472,256.

It would be desirable to provide a rail-mounted tonneau cover for vehicles which is capable of accommodating the seasonal variations and dimensions which are typically encountered in the fabric or vinyl covers which are employed in such systems.

It would further be desirable to provide such a rail based cover system which is capable of accommodating vehicles having beds which are not precisely rectangular in configuration.

It would further be desirable to provide improved means of connecting the cover to the rail system which are easier to handle and/or which are configured to accommodate localized variations in the dimensions of the cover.

These and other objects of the invention will become apparent in light of the present specification and drawings.

SUMMARY OF THE INVENTION

The present invention comprises, in part, a spacer apparatus for a rail system for attaching a cover for an open-topped vehicle enclosure, in which the enclosure has a plurality of sidewalls, each sidewall including at least a top wall portion, and the rail system including a pair of opposed, spaced, longitudinally extending rail members configured to be positioned above the top wall portions of the longitudinal sidewalls of the vehicle enclosure and a transverse rail member configured for positioning a top wall portion of a transverse sidewall of the vehicle enclosure.

At least two corner connector members are configured to connect one of the longitudinal rail members to the transverse rail member and the other of the longitudinal rail members to the transverse rail member. The spacer apparatus comprises at least one spacer member operably positionable in interposed relation between a respective one of the longitudinal rail members and a corresponding one of the corner connector members.

Each longitudinal rail member has a preselected cross-sectional configuration and the corresponding spacer member is configured to have a cross-sectional configuration which is substantially similar to the cross-sectional configuration of the corresponding longitudinal rail member.

The invention also comprises, in part, a corner connector apparatus for a rail system for attaching a cover for an open-topped vehicle enclosure, the enclosure having a plurality of sidewalls, each sidewall including at least a top wall portion, the rail system including at least two substantially longitudinally extending rail members and at least two substantially transversely extending rail members, the corner connector apparatus for a rail system for attaching a cover further being operably configured for enabling the attachment of the rail system to a vehicle enclosure wherein the corners of the sidewalls are arranged in a non-rectangular plan configuration, the corner connector apparatus for a rail system for attaching a cover comprises at least one adjustable corner connector apparatus including adjustable corner connector apparatus.

The adjustable corner apparatus includes a first corner connector member, a second corner connector member, means for pivotally connecting the first corner connector member to the second corner connector member, in which the means for connecting the first and second corner connector members further includes means for releasably retaining the first and second corner connector members in a plurality of angular orientations relative to one another. The first and second corner connector members further including means for connecting the respective corner connector members to corresponding rail members. The first and second corner connector members are configured for accommodating a range of relative angular positions from approximately 60° to 110°.

The invention further comprises, in part, an apparatus for attaching a rail-mounted cover for a rail-mounted open topped vehicle enclosure, said enclosure having a plurality of sidewalls, each sidewall including at least a top wall portion, said apparatus for attaching a cover comprising at least one rail member including; a bottom surface configured to rest on an upper surface of the top wall portion, and outwardly facing inclined side surface having at least a lower edge; at least one discrete, separate cover attachment member, removably mounted upon the at least one rail member; means for attaching the at least one discrete, separate cover attachment member to the at least one rail member, the attachment means further including means for enabling the positioning of the at least one discrete separate cover attachment member in one of a plurality of possible positions along the inclined dimension of the inclined side surface, for enabling the at least one discrete separate cover attachment member to impart to the cover a selectively variable amount of tension depending upon the position of the cover attachment member along the inclined dimension of the inclined side surface of the at least one rail member. A plurality of longitudinally extending grooves are disposed in the at least one rail member. The at least one discrete separate cover attachment member includes a substantially U-shaped member configured for sliding receipt along the lower edge of the inclined side surface, and a tab member connected to one leg of the U-shaped member and configured for receipt within at least one of the plurality of notches within the rail member, and a connector member connected to the other leg of the substantially U-shaped member.

At least one discrete separate cover attachment members includes means for precluding uninhabited sliding of the at least one cover attachment member along the at least one rail member.

The invention further comprises, in part, an apparatus for attaching a cover for an open-topped vehicle enclosure, said enclosure having a plurality of sidewalls, each sidewall including at least a top wall portion, comprising at least one rail member including a bottom surface configured to rest on an upper surface of said top wall portion; an outwardly facing inclined side surface having an overhanging lip portion, having further a lower edge; and at least one articulable cover attachment member, affixed to a peripheral portion of a flexible cover and configured for articulated engagement with the lower edge of the overhanging lip portion of the at least one rail member.

The at least one articulable cover attachment member comprises a plurality of cover attachment member segments hingedly connected to one another for mutual coordinated articulation relative to one another.

The plurality of cover attachment member segments are preferably formed as part of a single monolithic cover attachment member.

DETAILED DESCRIPTION OF THE INVENTION

While this invention is susceptible of embodiment in many different forms, there are shown in the drawings and will be described in detail herein, several specific embodiments, with the understanding that the present invention is to be considered as an exemplification of the principles of the invention and is not intended to limit to the invention to the embodiments illustrated.

Figure 1:
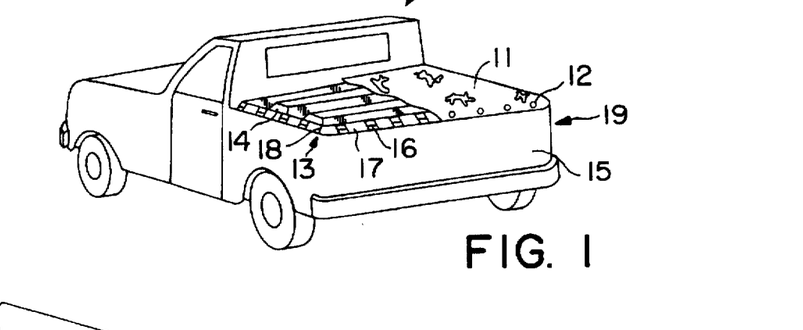
FIG. 1 is a perspective view of a vehicle having a prior art rail mounted tonneau cover apparatus.

FIGS. 1 illustrate a prior art rail based tonneau cover system. Vehicle 10 has a truck bed 19 including tailgate 15. Cover 11 is affixed, for example by female snap members 12, to male snap members 16, which are clipped onto rails 17. The four rails 17 typically are arranged in a rectangular configuration, substantially corresponding to the perpendicularly arranged walls of the truck bed. Bows 14 may be provided to give the cover 11 an upwardly convex configuration for facilitating the runoff of rain water, snow, etc. Each of the rails 17 is connected to adjacent ones of the rails 17 by a corner connector 18 (See FIGS. 2a–2b). Each connector 18 typically includes a main body 21, from which two attachment members 22, each of which typically is configured to be insertingly received within a channel in rails 17, emanate at right angles from body 21. Cover 11 is typically made of fabric reinforced vinyl or a similar material.

Figures 2A, 2B:
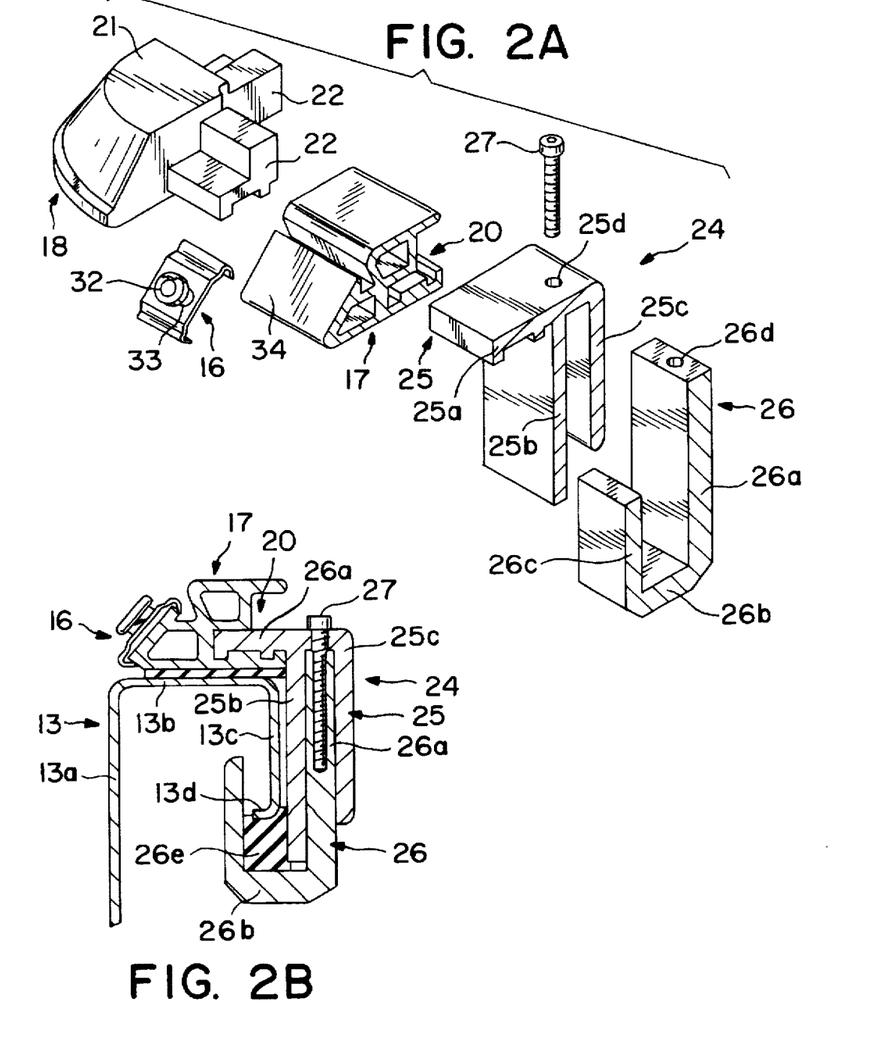
FIG. 2a is a prior art corner connector apparatus shown with a segment of a prior art rail for a rail-mounted tonneau cover system, in an exploded view.
FIG. 2b is a prior art corner connector apparatus shown with a segment of a prior art rail for a rail-mounted tonneau cover system.

FIG. 2b illustrates a typical truck bed sidewall 13, upon which a prior art cover system (FIG. 1) is attached. Sidewall 13 includes outer wall portion 13a, top wall portion 13b, and downwardly extending inner wall portion 13c. Rail member 17 is held in place on sidewall 13 by clamp apparatus 24. Clamp apparatus 24 includes upper member 25 and lower member 26. Upper clamp member 25 includes top arm 25a and legs 25b, 25c, and aperture 25d, which may be internally threaded. Lower member 26 includes long leg 26a, bottom leg 26b and short leg 26c, as well as bore 26d which is threaded. Bores 25d and 26d become aligned when upper member 25 engages lower member 26 as shown in FIG. 2b. Bolt 27 is configured to be received through bore 25d to engage bore 26d.

Typically, rail 17 is attached to sidewall 13 by first engaging top arm 25a of upper member 25 into channel 20 of rail 17. Top arm 25a typically will have a contour configured to positively engage corresponding surfaces inside channel 20. Rail 17, which may have a suitable padding member 17a, to prevent marring of top wall 13b, is then placed on top wall 13b. Lower member 26 is brought into engagement with upper member 25, in the orientation shown in FIG. 2b. Bolt 27 inserted into now-aligned bows 25d, 26d and tightened. Depending upon the exact configuration of lower member 26, bottom leg 26b (which may be padded by resilient member 26e) engages lower edge 13d of inner wall portion 13c, and tightening of bolt 27 is continued, until the desired degree of tightness is attained. Alternatively, lower member 2b may be provided with a "short leg" 26c which is longer than that illustrated in FIG. 2b, so that an upper edge of "short leg" 26c abuts the underneath of top wall portion 13b, at the same time or before bottom leg 26b engages lower edge 13d.

It has been found that over time, a significant seasonal variation in the longitudinal and transverse dimensions of such covers used for such apparatus occurs, as a result of the change in outdoor temperatures. In addition, typical cover materials have a certain amount of stretch capability (extension resulting from force exerted on the cover), which is independent of the seasonal dimensional variation. However, it is desirable that the cover not have too much capacity for stretching, as this will result in distension of the cover, so that the cover will collect rain or snow during a heavy rain- or snowfall, and collapse. At least one known cover material which is used has a capacity for stretch along one direction (usually from side to side) of 3.5%–6.5%, and a capacity for stretch in the perpendicular direction (usually front to rear) of only 0.5%. This preference for a cover material having non-uniform stretch characteristics is common. The side-to-side stretch makes the task of accommodating seasonal variations in side-to-side dimension easier, since the cover can be appropriately sized to take into account the stretch relative to the seasonal variation. However, the small amount of front-to-rear stretch makes such accommodation of seasonal front-to-back variation difficult. Accordingly, as a result of such seasonal variation, during at least one portion of the year such covers may be too tight (or conversely, too loose, depending upon the original size) from front to back.

One aspect of the present invention comprises an apparatus for accommodating such seasonal variation in the dimensions of the covers, and discrepancies in the stretch characteristics thereof.

Figure 3:
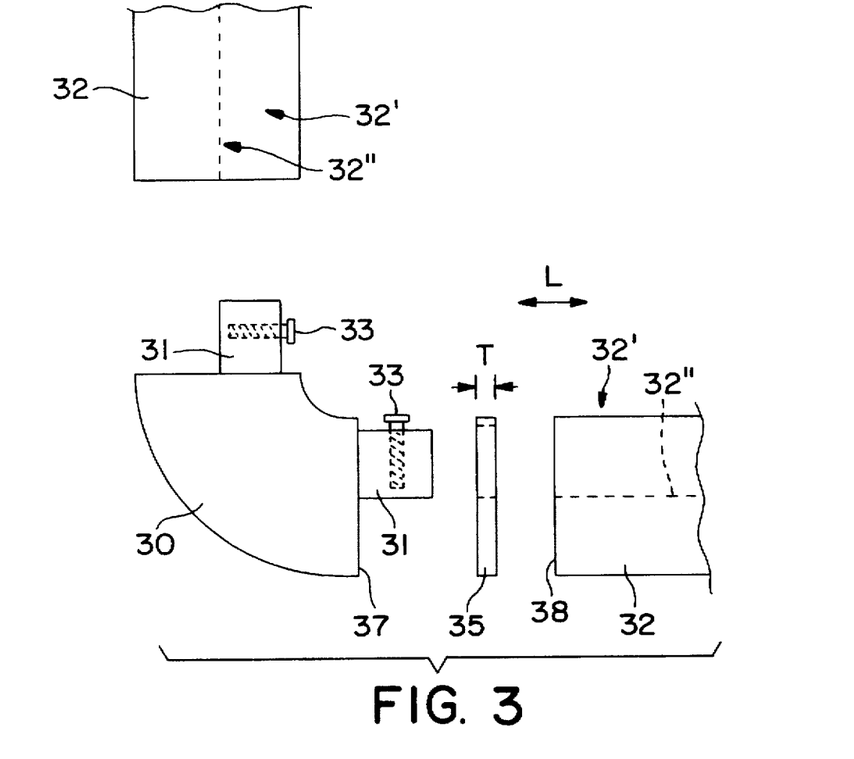
FIG. 3 is a top plan view of a corner connector apparatus showing its connection to two rail segments and further showing a corner spacer apparatus according to the present invention.

FIG. 3 illustrates an embodiment of a spacer apparatus according to the present invention, for use for accommodating seasonal expansion of a cover. Corner connector 30, which may be of otherwise conventional configuration, includes two attachment members 31. Each attachment member 31 will have a cross-sectional configuration suitably configured to mate with a longitudinally extending channel, generally indicated by 32', within rail 32.

Figure 4:
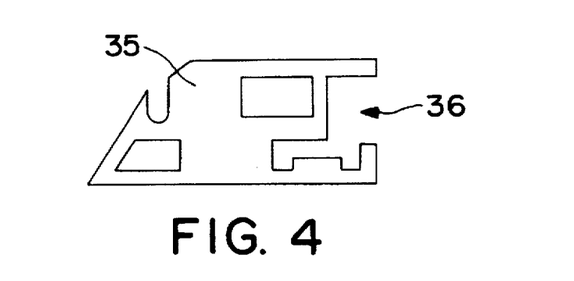
FIG. 4 is a side elevation of the cross section of a corner spacer apparatus according to the invention of FIG. 3.

During summer or in hot climates, the cover will generally be dimensionally expanded, as compared to winter or cold climate conditions. Since covers typically are attached by some form of snap or clip which requires at least a minimal amount of stretching of the cover in order to fasten the cover to the rails, the cover preferably will be fabricated so that its dimensions formed for summer/hot conditions. Spacer member(s) 35 are provided between the tail-gate ends of the longitudinally extending rails, and their respective corner members. Spacer member 35 may be fabricated from any suitable material such as the rail material (which is typically aluminum), or alternatively, spacer 35 may be fabricated from a relatively tough plastic or polymer based material. Spacer member 35 is illustrated as having a generally rectangular cross-sectional configuration as viewed from above in FIG. 3. Preferably the cross-sectional view from the side will be substantially identical to that of the specific rail configuration with which spacer member 35 is being used, such as shown in FIG. 4. Spacer 35 typically will have a passage 36 extending therethrough which will insertingly receive attachment member 31 and permit the passage of bolt 33 in order that attachment of member 31 to rail 32 can occur in the usual manner, except that in view of the presence of spacer member 30, faces 37, 38 of corner connector 30 and rail member 32, respectively, are now separated by a distance substantially equal to the transverse thickness T of spacer member 35.

During cold weather or winter, when the cover (not shown in FIG. 3) has contracted, the front-to-rear dimension of the cover will become too short to enable attachment to the tail-gate situated transverse rail (with the spacer members 35 in place). Accordingly, spacer members 35 can be removed, and rails 32 will be abutted directly against corner connector 30 and affixed thereto by the tightening of bolts (turn screws, thumb screws, etc.) 33, which bear against interior walls 32" in channels 32' of rails 32. In this manner, typical covers, which have non-uniform stretch characteristics, can be accommodated. Of course, if a cover should be used which has greater longitudinal stretch than transverse stretch, the placement of the spacer members can simply be rotated 90° relative to the overall frame structure, to provide accommodation of transverse seasonal dimensional variation.

Pickup truck beds, especially those on newer vehicles, may not always have a rectangular layout, as viewed from above. Some newer vehicles have pickup beds which are curved or contoured in such a way that the sidewalls actually converge when proceeding from the rear of the vehicle cab toward the tailgate. Accordingly, it is a further aspect of the present invention to provide a rail construction which would accommodate such convergent pickup bed sidewalls. One way to do so would be to provide corner connector members having a configuration generally similar to those which would be used on a rectangular plan rail-based cover system, but provide that the attachment members have an included angle between them which is appropriate for the particular position relative to the truck bed. For example, the corner connector members nearest the cab would have attachment members with an included angle between them of greater than 0°, but less than 90°, while those nearest the tailgate would have an included angle between them of greater than 90° but less than 180°. The faces of the corner connector members which the rail ends abut would preferably be arranged to meet the rail ends squarely, without any gaps.

Figures 5, 6, 7:
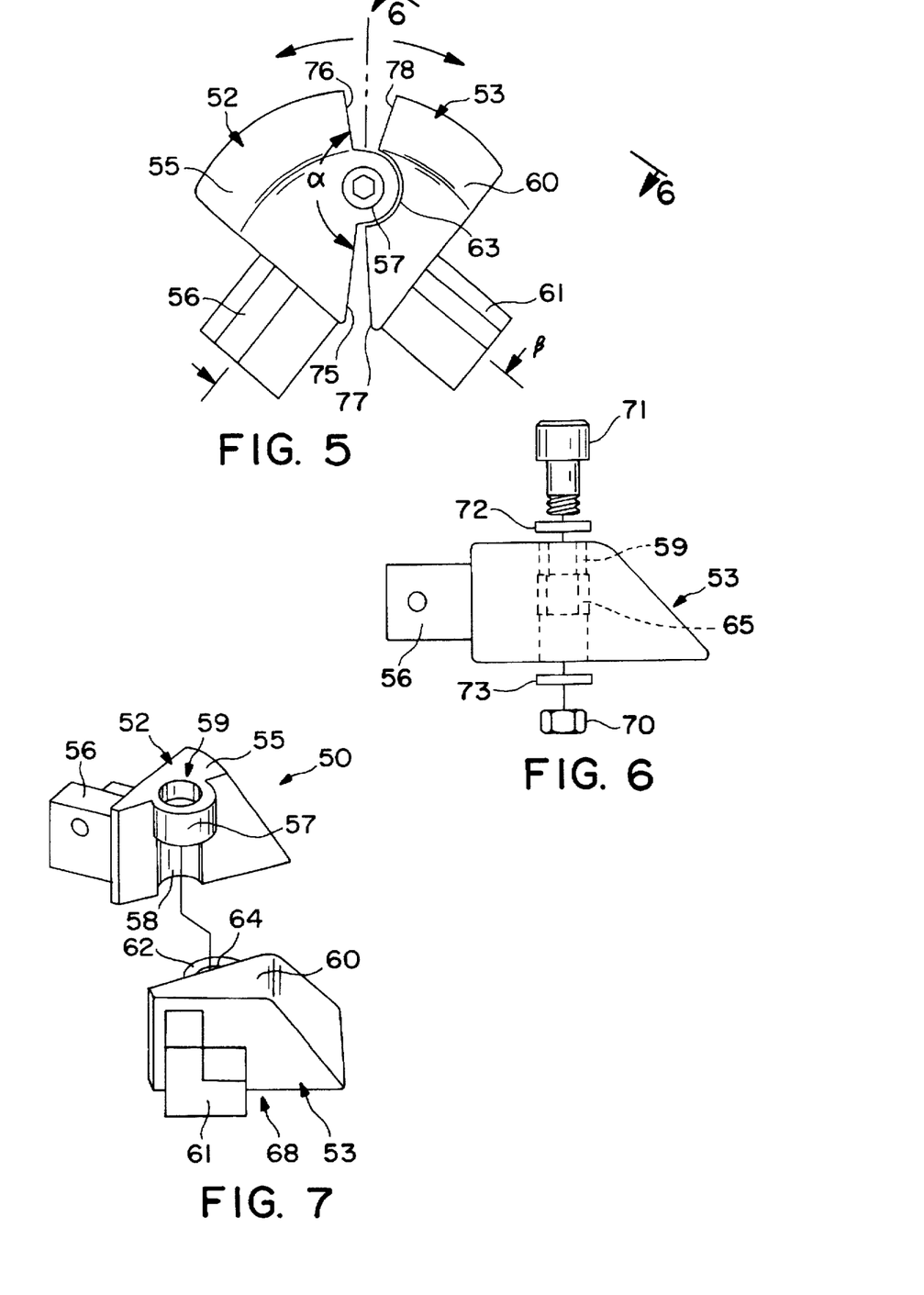
FIG. 5 is a top plan view of an adjustable corner connector apparatus according to the present invention.
FIG. 6 is a side elevation taken along line 6—6 of FIG. 5.
FIG. 7 is a perspective exploded view of the two connector halves for the adjustable connector apparatus according to the invention of FIGS. 5 and 6.

In a preferred alternative embodiment, as illustrated in FIGS. 5–7, a corner connector member is provided for accommodating different configurations of non-rectangular plan rail-based cover systems, without having to build separate dedicated rail constructions for each particular model vehicle. Accordingly, FIGS. 5–7 illustrate an improved corner connector construction which may be adapted for use with existing rail configurations, to accommodate such non-rectangular truck bed side wall configurations.

Corner connector 50 is formed from two halves 52 and 53. Connector half 52 includes body portion 55, attachment member 56 and pintle 57. Connector half 53 includes body portion 60, attachment member 61 and pintle 62. In addition, connector half 52 includes generally a semi-circular recess 58 configured to pivotally accommodate pintle 62 of connector half 53. Conversely connector half 53 has a semi-circular recess 63, which is configured to pivotally accommodate pintle 57 of connector half 52. Pintle 57 is provided with a central bore 59 and pintle 62 is provided with a bore 64. Bores 59 and 64 are advantageously positioned so as to be aligned vertically when pintle 57 is nested within recess 63 and pintle 62 is nested within recess 58.

In a preferred embodiment of the invention, pintle 62 may have provided within it a recess for receiving, in a non-rotatable manner, a nut, such as nut 70, the purpose for which will be described hereinafter. Alternatively, pintle 62 may be positioned so as to be raised slightly above the level of the bottom 68 of connector half 53, so that a remaining portion of recess 58 will enable the accommodation of nut 70.

To attach halves 52 and 53, first the respective pintles 57 and 62 are nested within their corresponding recesses 58 and 63, so that bores 59 and 64 become aligned. Bolt 71 is then passed through aligned bores 59 and 65. Washers 72 and 73 may be provided to facilitate the maintaining the proper tension on bolt 71. Nut 70 engages bolt 71.

In order to permit angular accommodation, the juxtaposed faces 75, 76, 77, and 78 of halves 52 and 53, respectively are not coplanar. Instead, the included angle alpha α between faces 75 and 76, for example, is less than 180°. In a preferred embodiment of the invention, the included angle between faces 77 and 78 is likewise less than 180° and, in a most preferred embodiment, is the same angle alpha α as between faces 75 and 76. In this way, upon attachment of half 52 to half 53, half 52 and half 53 can be pivoted relative to one another about nut 71 so that the angle beta β between attachment members 56 and 61 can be varied in arrange of approximately 60° to 110°.

Figure 8:
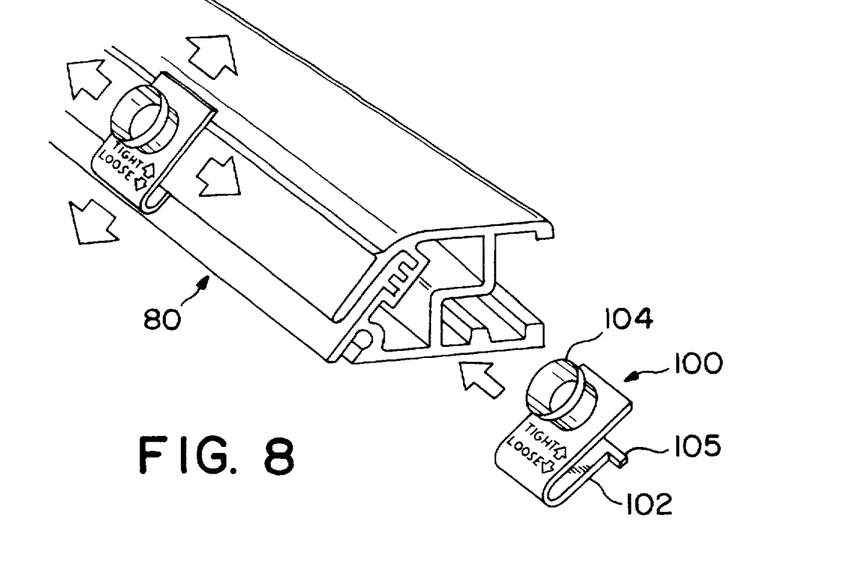
FIG. 8 is a perspective view of a rail section and a snap clip apparatus according to the present invention.
Figure 9:
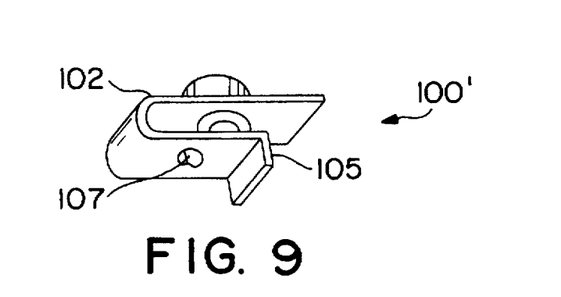
FIG. 9 is a perspective view of a snap clip to be positioned on an end of a rail, according to the invention of FIG. 8.
Figure 10:
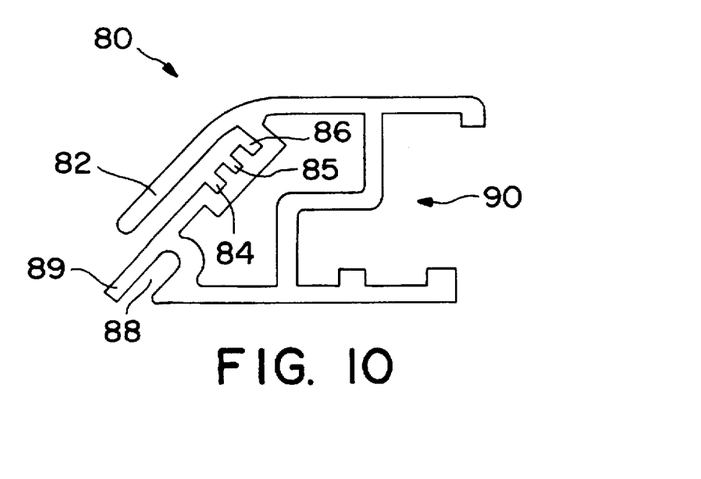
FIG. 10 is a side elevation showing the cross sectional configuration of the rail of the invention of FIGS. 8 and 9.

In a further alternative embodiment of the invention, illustrated in FIGS. 8 and 9, is an improved rail and fastener configuration for use with those types of covers in which are provided conventional female snap fastener members which are embossed into the periphery of the cover. An enlarged side elevation of a rail cross-sectional configuration is shown in FIG. 10. The rail 80 includes an overhanging lip 82 and a plurality of parallel notches 84, 85 and 86, all of which preferably extend longitudinally the length of rail 80. Rail 80 also includes a lower notch 88 formed by overhanging lip 89. Channel 90 is formed to receive clamping members (not shown, but which may be of otherwise conventional configuration) as well as attachment members for the corner connectors, such as those previously described. Adjustable snap clip 100 (see FIGS. 8 and 9) includes a generally U-shaped member 102 which has one leg which is longer than the other. On the long leg is attached a male snap member 104, which is suitably configured to interengage and connect with typical female snap members which are affixed to cover members in a manner known in the art. On the short leg of U-shaped member 102 is formed a tab 105 which generally extends perpendicularly relative to the short leg, away from the longer leg of U-shaped member 102. Each snap clip 100 is placed on rail 80 by sliding the snap clip onto a free end of a rail 80 prior to assembly of same on the truck. By selecting which one of notches 84, 85 or 86 in which to insert tab 105, the relative height of the male snap member 104 with respect to rail 80 can be varied in accordance with the requirements of the cover for greater or lesser degrees of tightness.

Such adjustable snap members can be used, for example, on the tailgate rail of a truck bed cover assembly in addition to or instead of the spacers described with respect to FIGS. 3 and 4, to accommodate seasonal variations in the longitudinal dimension of typical truck bed tonneau cover members. Alternatively, such rails 80 and snap clips 100 can be utilized around the entire perimeter of a truck bed rail based tonneau cover system, for accommodating dimensional changes (some of which may be localized) over the surface of the truck bed cover member in both longitudinal and transverse directions.

In order to facilitate the maintenance of a plurality of snap clips 100 on a given rail member 80, it is desirable to provide a way in which that the snap clips 100 do not slide off when individual rail members are being moved about. Accordingly, as illustrated in FIG. 9, specialized snap clips 100' can be provided which are substantially identical to the other snap clips 100 utilized on the rails. However, such snap clips 100' are provided with an additional spur 107 which projects downwardly against the portion of the rail adjoining overhanging tab 89 to provide a binding frictional force which makes such snap clips 100' tend to bind and not freely slide along the length of rail 80. Accordingly, such snap clips 100' would preferably be the last clips applied to the positions immediately adjacent the ends of any given rail member 80. In a preferred embodiment of the invention, the spurs 107 will be sized so as to provide a moderate amount of frictional force which can be overcome, for example, by the use of manual force without the need for specialized tools, but which will prevent free sliding of the snap clips.

Figures 11, 12, 13, 16:
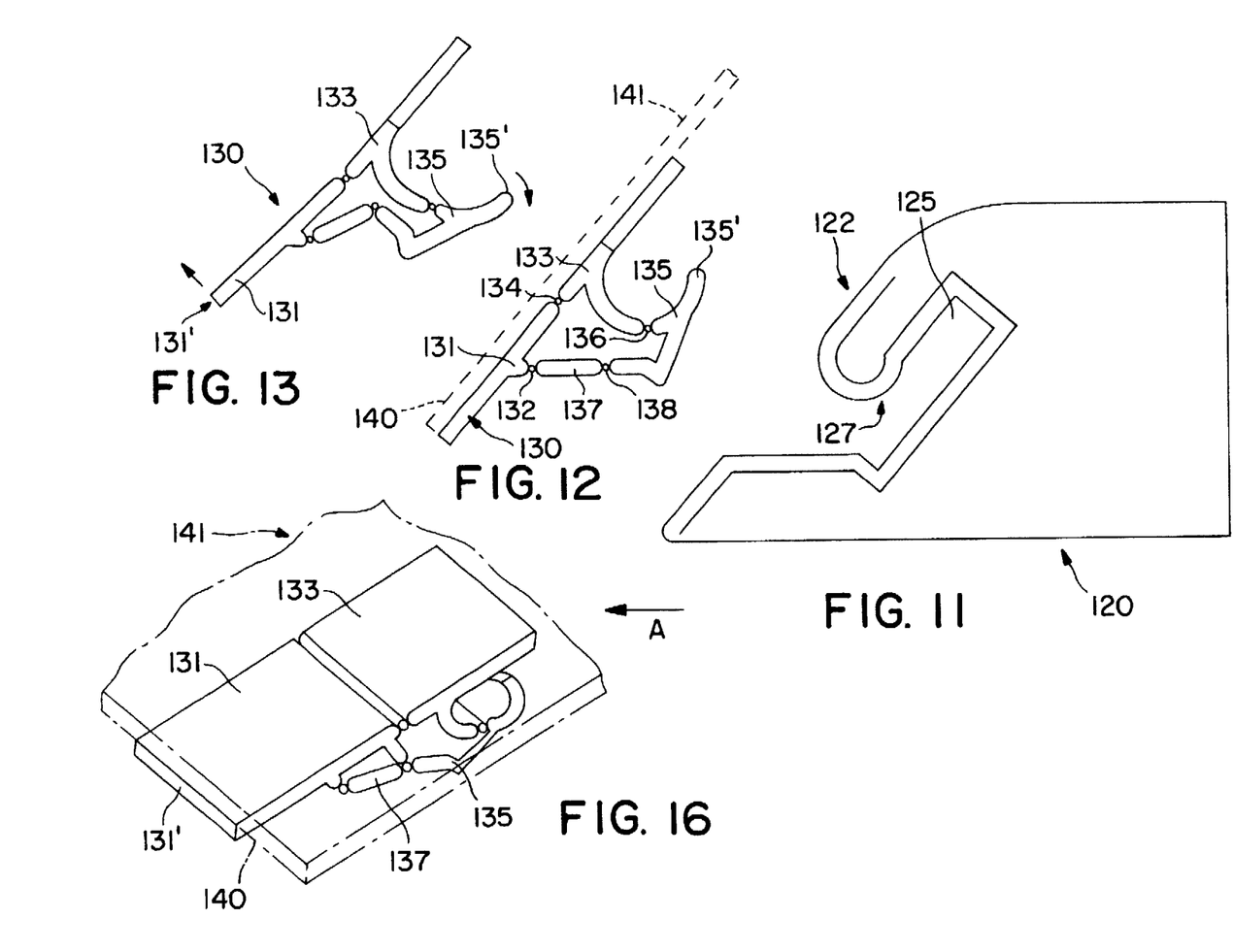
FIG. 11 is a side elevation, showing schematically in part, a cross section of a rail according to another embodiment of the present invention.
FIG. 12 is a side elevation showing the cross sectional configuration of the articulate articulable snapless fastener for use with the rail of FIG. 11.
FIG. 13 is a side elevation showing the snapless fastener of FIG. 12 in an articulated configuration.
FIG. 16 is a perspective fragmentary view of a snapless fastener.

A still further, alternative embodiment employing a "snapless" apparatus for attaching a cover to a rail is provided in FIGS. 11 through 13. A cross section of a rail member 120 is shown, partially schematically, in FIG. 11. Rail 120 includes an overhanging lip 122 and a notch 125. Overhanging lip includes a bead 127. FIGS. 12 and 13 illustrate an articulable snapless fastener 130. In an embodiment of the invention, snapless fastener 130 comprises a plurality of articulated segments 131, 133, 135 and 137, connected by joints 132, 134, 136 and 138. In a preferred embodiment of the invention each snapless fastener 130 is preferably fabricated with segments 131, 133, 135, and 137 being formed from substantially rigid material, with joints 132, 134, 136 and 138 comprising veins of resilient flexible material and formed by conventionally known processes, such as by extrusion or molding. Alternatively, each fastener 130 may be formed from a monolithic piece of flexible resilient plastic material. Each snapless fastener 130 may be of relatively short length (on the order of inches) or it may be of substantial length of several inches or a foot or more. Each snapless fastener 130 is intended to be attached to the hem 140 of the cover 141 (FIGS. 12, 14, 16) by staples, sewing, rivets, etc.

Figure 14:
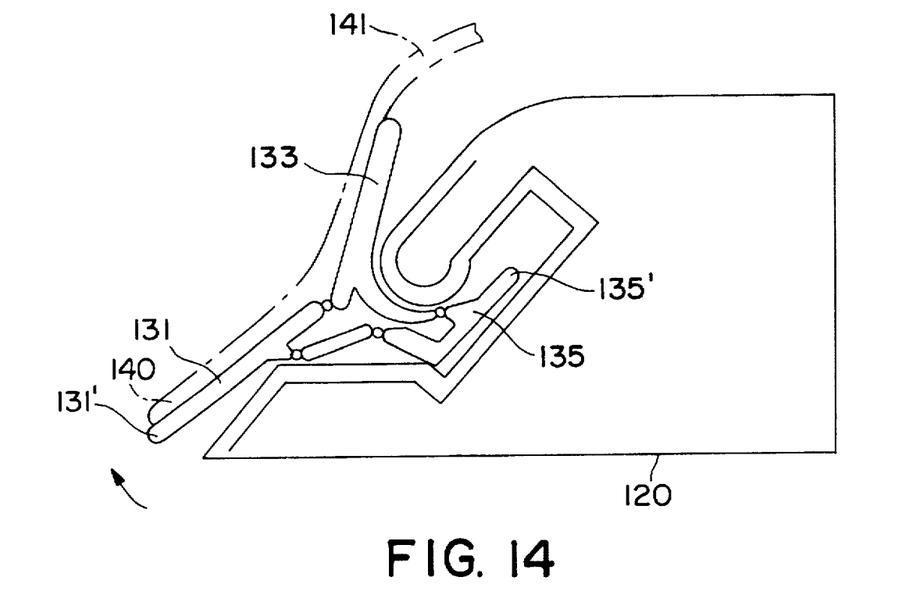
FIG. 14 is a side elevation showing the snapless fastener of FIG. 11–16 being positioned on 9 rail.

In operation, a cover is positioned generally over the rails 120 and the individual snapless fasteners 130 are located about the periphery of the cover such that the hook portion 135 of each snapless fastener 130 rests substantially just above overhanging lip 120 and bead 127. Each snapless fastener 130 is sequentially grasped at the extreme end 131' of segment 131 and lifted upwardly (FIG. 14). The articulation of the various segments of each snapless fastener 130 will cause the hooked end 135' of segment 135 to correspondingly arc downwardly so as to clear bead 127 of overhanging lip 122.

Figure 15:
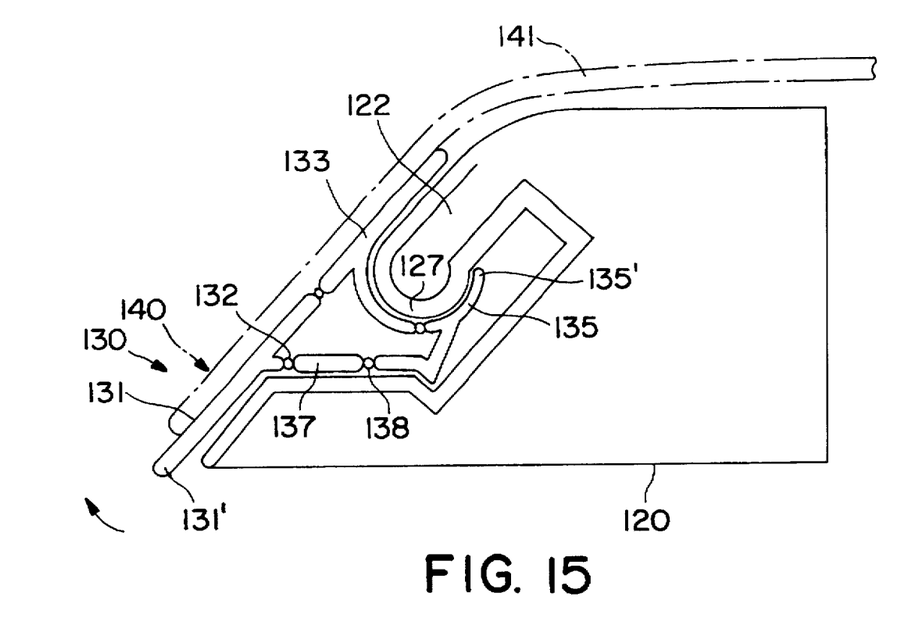
FIG. 15 is a side elevation showing the snapless fastener in position on a rail.

While the end 131' of a snapless fastener 130 is being held upward, the hem 140 of the cover 141 is pressed downward so that hooked portion 135' passes bead 127. Then the end 131' of segment 131 is released, and the resiliency of the snapless fastener 130 causes the fastener to assume the configuration illustrated in FIG. 12 and FIG. 15 with the hooked portion 135' curving around and engaging the underside of bead 127. In this manner, it is possible to attach a cover 141 without having to pull a given portion of the edge of the hem of the cover outwardly (that is, in the direction of arrow A of FIG. 11) past the outer edge of the rail 120 in order to achieve fastening, as is often required even in the case of most typical snap-type fasteners, which are used with rail based tonneau cover systems. In a preferred embodiment of the invention a plurality of snapless fasteners 130, each having a longitudinal length of, for example, approximately one inch, are sewn into the hem at spaced apart positions along the entire periphery of the cover or, in those embodiments in which the cover is otherwise attached to the rail behind the cab, along the remaining three or fewer sides of the cover. Removal is accomplished by raising end 131' in the direction of the arrow in FIG. 14.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

I claim:

1. An apparatus for attaching a cover for an open-topped vehicle enclosure, said enclosure having a plurality of sidewalls, each sidewall including at least a top wall portion, said apparatus for attaching a cover comprising:

at least one rail member including, a bottom surface configured to rest on an upper surface of said top wall portion, an outwardly facing inclined side surface having an overhanging lip portion further terminating in a longitudinally extending bead, defining a substantially downwardly opening notch extending longitudinally along the rail member; and at least one articulable cover attachment member, affixed to a peripheral portion of a flexible cover and configured for articulated partially encircling engagement with the longitudinally extending bead of the overhanging lip portion of the at least one rail member.

2. The apparatus for attaching a cover according to claim 1 wherein the at least one articulable cover attachment member comprises a plurality of cover attachment member segments hingedly connected to one another for mutual coordinated articulation relative to one another.

3. The apparatus for attaching a cover according to claim 2 wherein the plurality of cover attachment member segments are formed as part of a single monolithic cover attachment member.

* * * * *